United States Patent

[11] 3,599,650

[72] Inventor James M. Abraham
 Gahanna, Ohio
[21] Appl. No. 811,428
[22] Filed Mar. 28, 1969
[45] Patented Aug. 17, 1971
[73] Assignee Auto Magic Car Wash Corporation
 Columbus, Ohio

[54] CAR WASH
 22 Claims, 8 Drawing Figs.
[52] U.S. Cl. ..................................................... 134/123,
  239/185
[51] Int. Cl. ...................................................... B60s 3/04
[50] Field of Search........................................... 134/123,
  45; 239/185

[56] References Cited
 UNITED STATES PATENTS
 3,038,481 6/1962 Brechtel....................... 134/178 X
 3,167,797 2/1965 Hergonson.................... 134/123 X
 3,398,755 8/1968 Hudson et al................. 134/123 X Primary Examiner—Price C. Faw, Jr.
Attorneys—Frank H. Foster and Jerome R. Cox ABSTRACT: An automatic car wash apparatus of the type having a spray bar mounted on a movable carriage which is driven on an endless carriage track around a parked automobile and which as it is driven sprays cleaning fluids and rinse water on the automobile in a selected sequence is disclosed. The endless carriage track is positioned above and around the parked automobile. The carriage is driven around the carriage track by a motor which is mounted on a motor dolly, the motor dolly being slidable along a substantially central linear track. An endless cam track surrounds the carriage track and is in cam relationship with the spray bar. The cam track serves to slide the spray bar inwardly and outwardly relative to the carriage track in order to position the spray bar the proper distance from the parked car. The vertical member of the spray bar is rotatable about its vertical axis and is rotated by another cam follower in cam relationship to the cam track so that the spray from the vertical spray bar is always maintained approximately perpendicular to the side of the car being cleaned. The spray is preferably maintained at a slight leading angle to the perpendicular. A fluid conducting swivel is disclosed having not only a stationary member with an input port and a rotatable member with an output port, the ports being in fluid communication, but also having a coaxial passageway through it through which the motor shaft can extend and transmit mechanical power from the motor to the carriage.

INVENTOR.
JAMES M. ABRAHAM
BY Frank H Foster
ATTORNEY

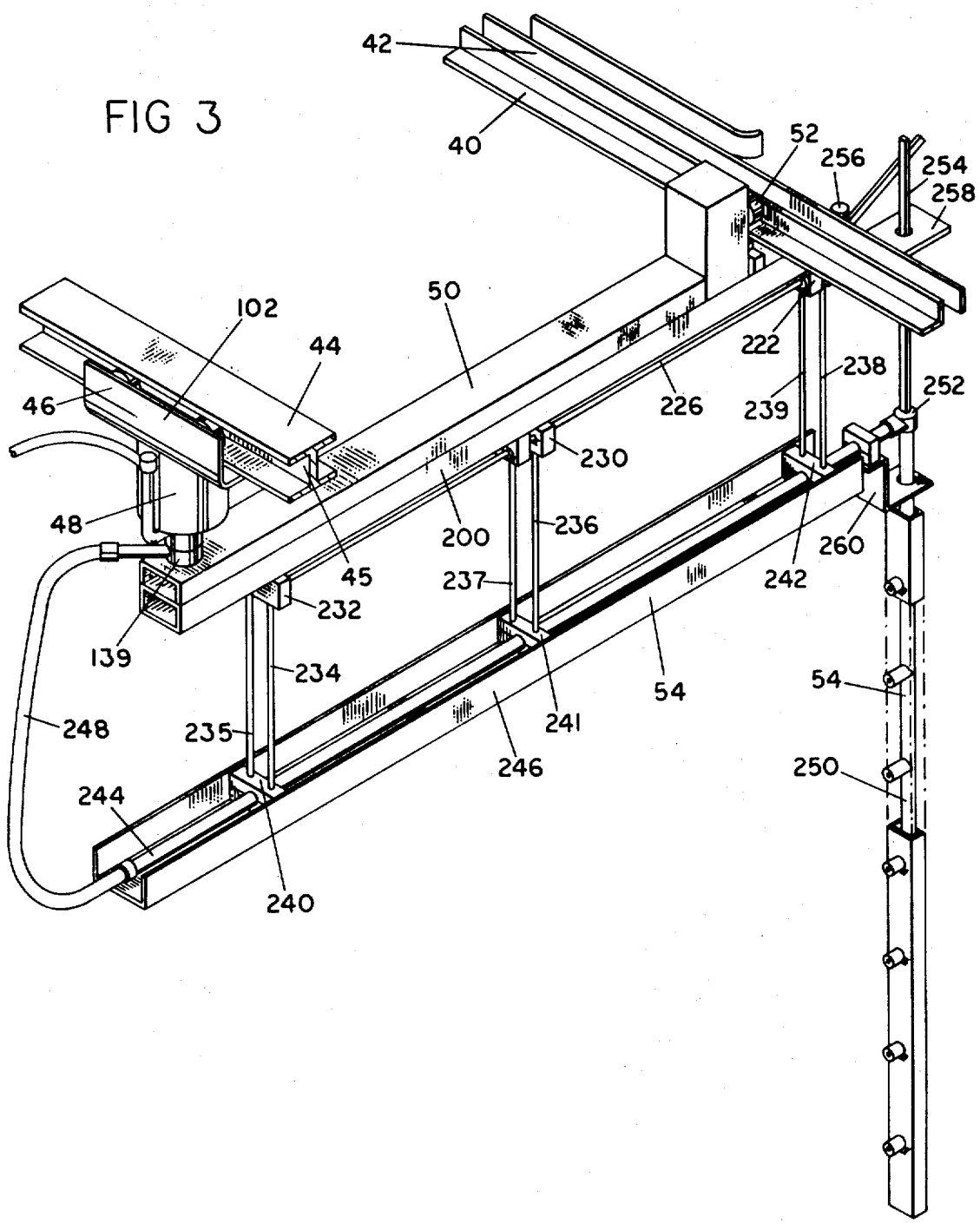

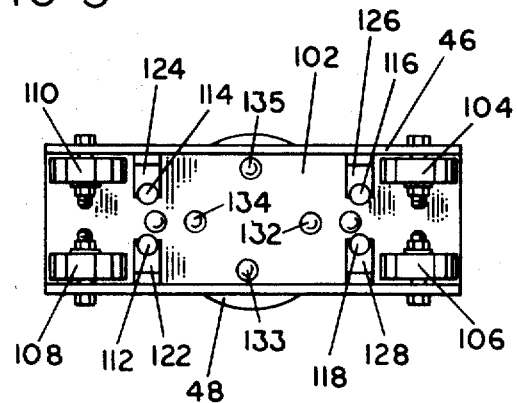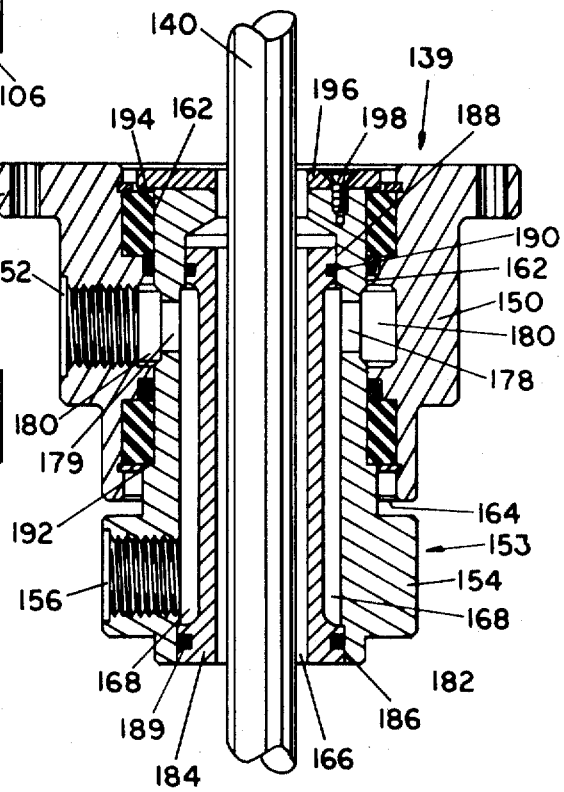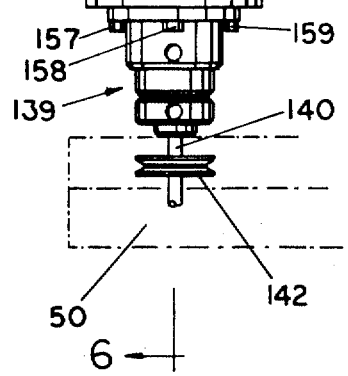

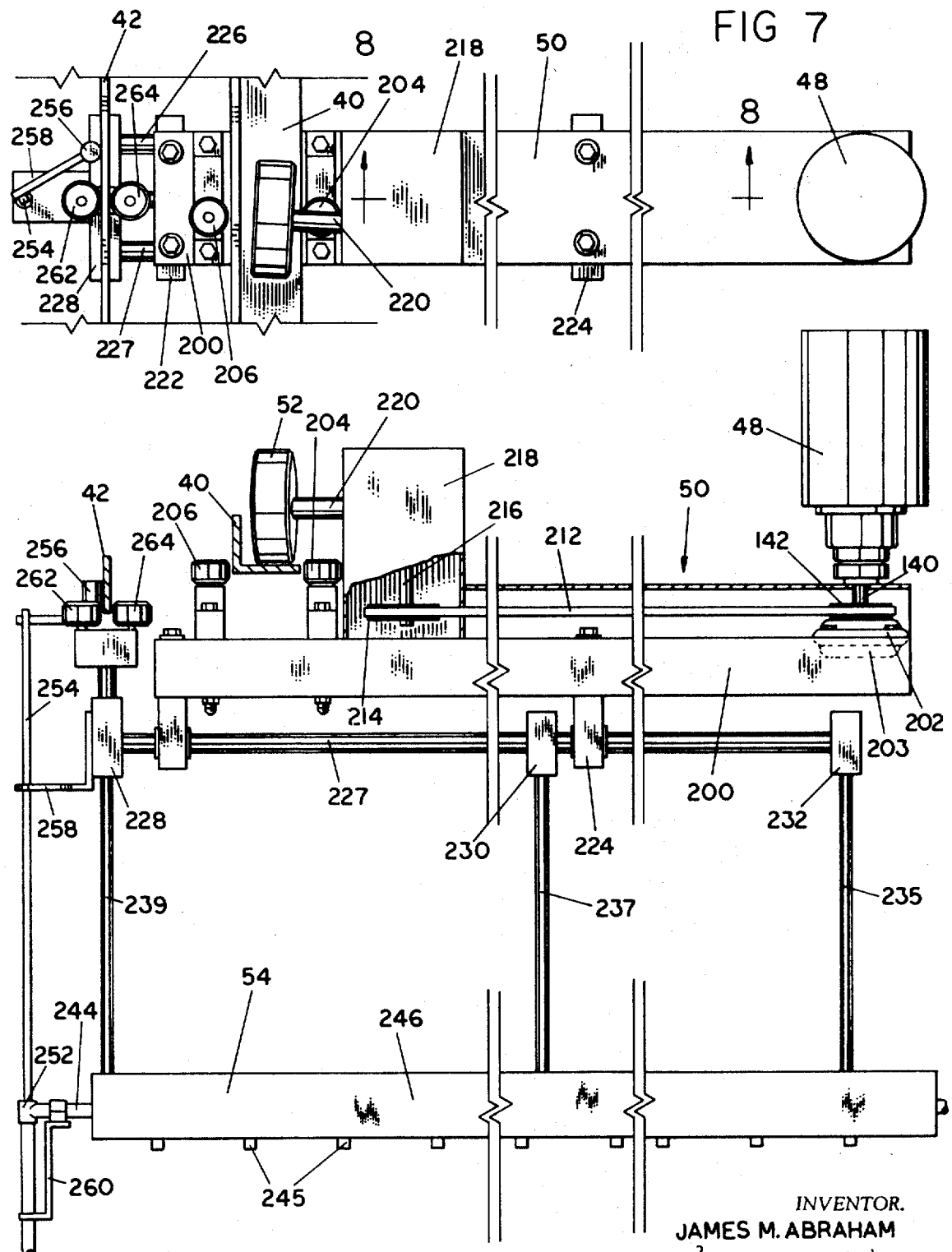

0# CAR WASH

This invention relates to an automatic car wash, and more particularly relates to an automatic car wash of the type in which the washing and rinsing are preformed by the spraying of water or cleaning fluids from a spray bar which is traveling around the vehicle being washed.

The first of the recently successful commercial car washes involved the type of car wash in which the vehicle was towed along an assembly line of sprays, brushes, and individual human beings who preformed various operations on the automobile as it passed by. More recently, the self-service car wash has been commercially successful in which a customer drives the vehicle into a washing bay and washes the car by directing a hand-held spray onto the vehicle for an allotted period of time. The most recent commercially successful car wash, and the type involved in this application, is the type in which a spray bar is traveled around the car and the car is washed fully by spraying without the need of human labor or for brushes in contact with the car body surface.

The complexity of this third type of automatic car wash has made it expensive to purchase and to operate.

One cause of expense both in initial cost and in maintenance, has been the need for rotary electrical contacts. These have been necessary because heretofore drive motors have been mounted on the moving carriage. Also, because the drive motor in prior art systems is mounted to the carriage, the prior art carriage tracks require sufficient strength to support this weight. My apparatus eliminates the need for rotary electrical contacts and removes 60 percent to 70 percent of the weight from the carriage. This weight removal from the carriage permits use of a lighter weight, relatively inexpensive carriage track rather then the conventional expensive floor mounted or extrusion formed tracks.

Car wash systems heretofore known require an excessive quantity of water. My apparatus requires only 15 percent to 50 percent of the water required by other systems. This results in savings in two ways. First, less water is consumed and less electricity is used in pumping and in heating it. Secondly, a smaller horsepower motor is needed because water is pumped at a smaller rate. The motor used in my apparatus costs less to purchase, less to install because single-phase 240 volt line voltage can be used, and costs less to operate.

It is therefore an object of the invention to provide an improved car wash.

Another object is to provide a car wash which does not require rotary electrical contacts.

Another object is to provide a car wash which does not have the heavy motor mounted on movable carriage.

Another object is to provide a car wash which properly cleans the contoured surfaces of the car especially those on the front of the car.

Another object is to minimize the quantity of water required to wash a car.

Another object is to operate the spray at maximum efficiency by maintaining it always properly directed against the car.

Another object is to direct the spray against all surfaces of the car at the inclination to the surface being cleaned which most efficiently cleans the surface.

Another object is to provide a water conducting swivel which permits a motor shaft to extend axially through it.

Further objects and features of the invention will be apparent from the following specification and claims when considered in connection with the accompanying drawings illustrating several embodiments of my invention.

SUMMARY OF THE INVENTION

I have found that the foregoing and other objects can be attained in a car wash apparatus of the type having a support frame, a pressurized water supply, at least one nozzle at times in fluid communication with the water supply for spraying water on a car, a carriage to which the nozzle is mounted for traveling around the car, and a carriage track mounted on the support frame on which the carriage is movably mounted and along which the carriage travels around the car, the apparatus comprising also: (a) a motor track mounted to the support frame; (b) a motor dolly mounted for longitudinal movement along the track; (c) a motor mounted to the motor dolly; and (d) drive means for the transmission and application of mechanical energy from the motor, the means being mounted to the carriage and drivingly connected to the motor, the means extending proximate to the carriage track and connected to a drive wheel drivingly engaging the carriage track, whereby, rotation of the motor rotationally drives the drive wheel on and along the carriage track and this moves the carriage along the carriage track.

These objects are further attained with an improvement in a car wash apparatus of the type having a support frame, a pressurized water supply, a generally vertically oriented spray bar having a plurality of nozzles at times in fluid communication with the water supply, a carriage to which the spray bar is mounted for traveling around a car, and an endless carriage track mounted on the support frame to which the carriage is movably mounted and along which the carriage travels, the improvement comprising: (a) means for rotatably mounting the vertical spray bar to the carriage for rotational movement around its vertical axis; (b) a cam follower linked to the vertical spray bar for causing a rotational movement of the spray bar around its vertical axis by movement of the cam follower; and (c) cam means cooperating with the cam follower for rotating the vertical spray bar to aim said nozzle means at a suitably positioned car.

The objects are further attained with a fluid conducting swivel of the type having a stationary port and a rotatable port in mutual fluid communication, the swivel comprising: (a) an outer member having a circular cylindrical cavity opening at an end to the exterior and further provided with a first port for providing fluid communication between the exterior and the cavity; and (b) an inner cylindrical member matingly, sealingly, and rotatably positioned in the cavity, having a longitudinal coaxial bore therethrough, having an annular chamber surrounding but not communicating with the bore, having a second port for providing fluid communication between the exterior of the inner member and the annular chamber, and having passageway means proximate said first port for providing fluid communication between the first port and the chamber; wherein fluid flow may be maintained between the ports at any angular position of the inner member relative to the outer member.

BRIEF DESCRIPTION OF THE DRAWINGS

FIG. 3 is a view in perspective illustrating the motor, motor dolly, carriage, and spray bar assembly of the preferred embodiment of the invention;

FIG. 4 is a front elevation view of the motor, motor dolly, and swivel illustrated in FIG. 1;

FIG. 5 is a plan view of the motor and motor dolly illustrated in FIG. 1;

FIG. 6 is a view in vertical section illustrating the swivel embodiment of the invention illustrated in FIG. 1 and taken substantially along the line 6—6 of FIG. 4;

FIG. 7 is a plan view illustrating the carriage portion of the preferred embodiment illustrated in FIG. 1; and FIG. 8 is a view in front elevation illustrating the carriage shown in FIG. 1 and partly in section taken substantially along the line 8—8 of FIG. 7.

Figure 1:
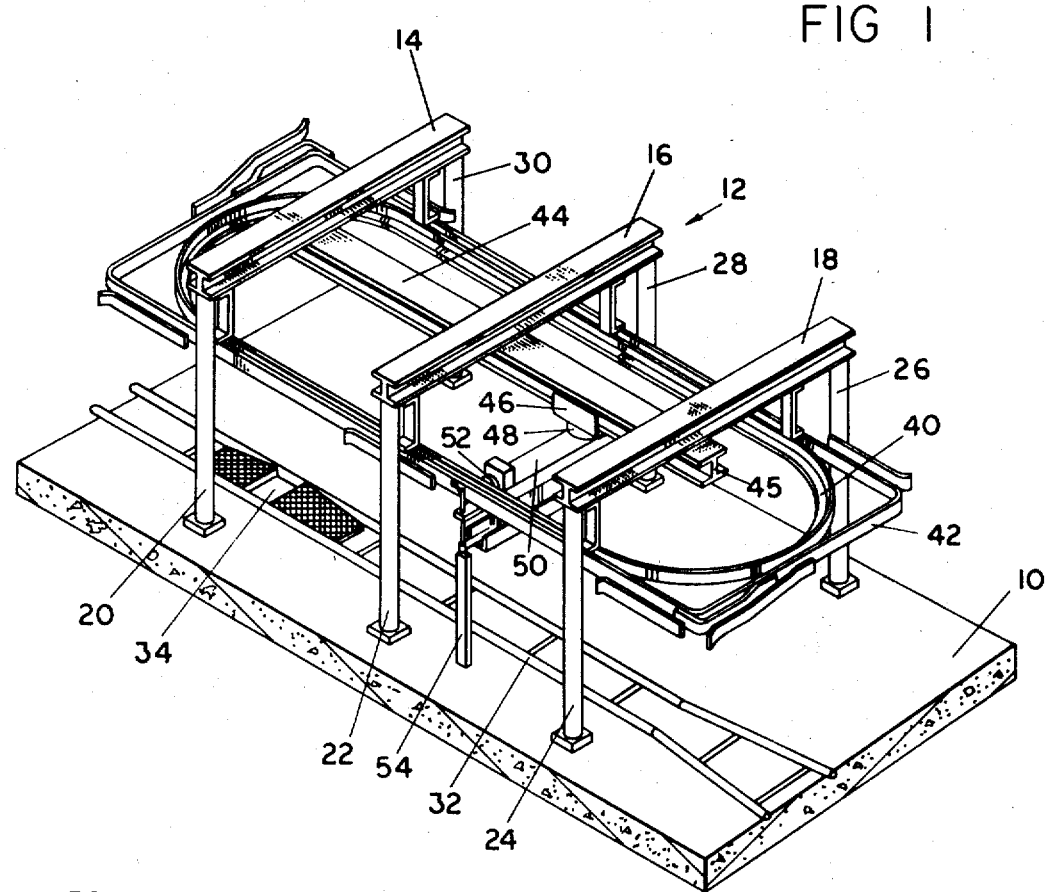
FIG. 1 is a view in perspective illustrating the preferred embodiment of the invention.

In describing the preferred embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

In FIG. 1 a car wash apparatus is illustrated. The water and cleaner supply systems are not illustrated because they are not directly involved in the novel aspects of the invention described herein. Described briefly, the apparatus has a support frame with three horizontal beams 14, 16 and 18, each beam supported by a pair of vertical columns 20 and 30, 22 and 28, and 24 and 26 respectively. These columns are supported on a base 10 which may be of concrete, as illustrated, or of any other suitable material. A tire guide 32 is provided in the base 10 to guide a car into the support frame 12, and a stop well 34 is provided to indicate the proper positioning of the car within the support frame 12. An endless carriage track 40 is mounted beneath the horizontal beams 14, 16, and 18 and sufficiently above the base 10 to permit a car to be driven beneath the carriage track 40. An endless, substantially rectangular cam track 42 is similarly mounted beneath the horizontal beams 14, 16 and 18 at approximately the same level as, and externally of, the carriage track 40. A motor track 44 is mounted at about the same level, centrally and longitudinally within the carriage track 40 and beneath the horizontal beams 14, 16 and 18. A motor dolly 46 is movably mounted to the motor track for a longitudinal movement along its length. A motor 48 is mounted on the motor dolly 46 and is connected to a carriage 50. The carriage 50 extends from beneath the motor 48 outwardly to the carriage track 40.

The carriage 50 is provided with a drive wheel 52 which rides on the carriage track 40. Suitable drive means for the transmission and application of mechanical energy from the motor 48 to the drive wheel 52 is provided within the carriage 50 so that the motor 48 drives the drive wheel along the carriage track 40 and thereby moves the carriage 50 along the carriage track 40. The carriage 50 has a spray bar 54 mounted beneath it. The spray bar 54 is provided with a plurality of nozzles which at times are in fluid communication with the water supply so that water may be sprayed on a car positioned within the support frame 12. The water supply is of course pressurized. Thus, in general operation, the drive wheel 52 moves the carriage 50 along a path completely around the carriage track 40 thus moving the spray bar 54 completely around a car. As the carriage 50 moves, it pulls the motor dolly 46 and the motor 48 forward and backward along the motor track 44.

Figure 2:
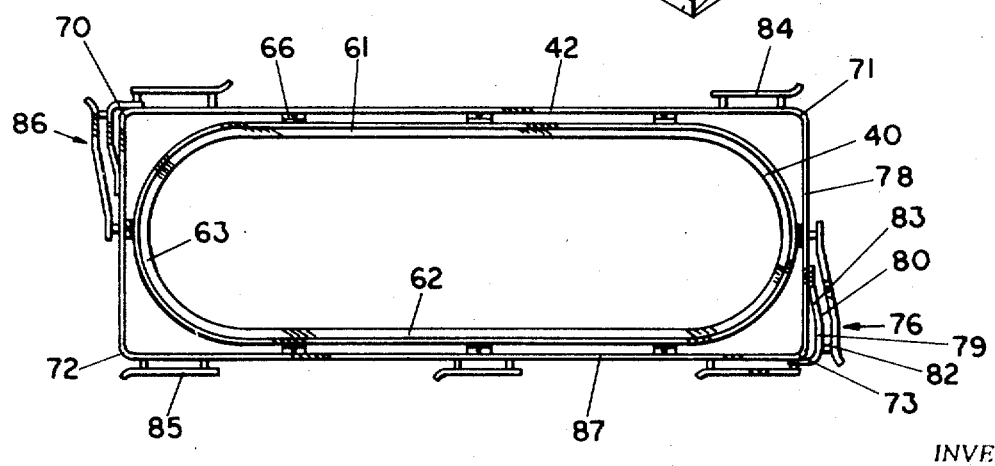
FIG. 2 is a plan view illustrating the carriage track and the cam track of the preferred embodiment of the invention.

The details of the preferred embodiment are illustrated in FIGS. 1 through 8. In FIG. 1 and FIG. 2, the preferred carriage track 40 and cam track 42 are illustrated. The carriage track 40 is constructed of right angle steel which is oriented so that the drive wheel 52 may ride along its horizontal portion. The carriage track 40 is shaped to have a pair of opposite linear sides 61 and 62, and a pair of opposite semicircular ends 63 and 64. Suitable brackets such as the bracket 66 connect the carriage track 40 to the cam track 42.

The cam track 42 is approximately rectangular and surrounds the carriage track 40. It has a length and width larger than that of the largest automobile expected in the car wash apparatus but approximately proportional to the length and width of such an automobile. This size is desirable so that the preferred spray bar 54 will clear any automobile positioned in the car wash. The four rounded corners 70, 71, 72 and 73 of the basic rectangular structure making up the cam track 42 are herein referred to as the symmetrical corners 70, 71, 72 and 73. These are not necessarily the actual camming corners of the cam track 42. For example, a cam track extension means 76 is provided at the symmetrical corner 73. The function of the extension means is to cause a cooperating cam follower to ride beyond the symmetrical corner 73, to turn the corner and be returned to cam relationship with the symmetrical side 78 of the cam track. Thus the preferred cam track 42 comprises a rectangular endless cam strip having suitably rounded corners and at least one and preferably two, extension means at opposite corners of the cam track. Each extension means has an extension strip, such as the extension strip 80, having a first portion fixed to and parallel with one of the sides 87 of the rectangular cam track strip 42, having a second contiguous portion 79 parallel to and externally spaced from the adjacent side 78 of the rectangular cam track strip and having a third contiguous portion 83 extending from the second portion to contact with the adjacent side 78. A retainer strip, such as the retainer strip 82 is externally spaced from and parallel to the second portion of the extension strip. The retainer strip assures that a cam follower will turn the corner.

The importance of the extension means is considered to be one very significant aspect of the present invention. Experience has shown that the front and the rear portions of the car are particularly difficult to clean adequately. The difficulty arises from the presence of a great number of cracks, crevices and contorted surfaces at the front and rear of an automobile. A substantial amount of dirt collects in these cracks and crevices and it is therefore essential that the spray bar direct its spray nearly perpendicularly into these cracks and crevices to remove the dirt. Experience has also, shown, however, that, as a conventional spray bar travels around the car, at the instant that it travels around a corner from a side of a car to either the front or the rear, it misses a portion of the front or the rear nearest to the side of the car. Such a conventional spray bar begins to turn a corner with its spray directed sideways and not toward the front of the car. As such a spray bar turns the corner, it moves not only sideways toward the center of the car but also rotates so that the spray is eventually directed on the front of the car. However, by the time the spray is directed perpendicularly onto the front of the car, the spray bar has moved a significant distance from the extreme side of either the front or the rear. The result of this is that an area at one side of the front and of the rear, namely one tail light and one head light of the automobile, will not be sufficiently cleaned. My cam track with its extension means, when cooperating with the other structure to be described, rotates the spray bar in a rapid manner which assures complete cleaning of the whole front and rear of the automobile.

The cam track extension means provides another very important advantage for the car wash. In many of the modern automobile body styles the headlights are mounted in a portion of the front fender which extends further forward than the hood grille, front bumper or any other part of the auto front. A similar situation often exists with the rear tail lights mounted in a rearwardly protruding portion of the rear fender. Such a body design requires a body surface, on the inner side of these protruding fender portions, which surfaces must blend the protrusion into the front of the automobile and which may be nearly parallel to the sides of the automobile. If a spray bar, which directs its spray nearly perpendicularly to the front of the car, is driven along parallel to the front, the spray will strike these critical blending surfaces at a very small angle nearly parallel to the surface. The result is that such surfaces are not properly cleaned.

I have discovered that it would be desirable to rotate the vertical spray bar a few degrees after it turns the corner from a side to a front immediately after it passes the first headlight. The vertical spray bar would be rotated to impinge more nearly perpendicular on these blending surfaces.

The extension means 76 and 86 accomplish this backward rotation. More specifically the vertical spray bar 54 is properly rotated as a cam follower travels between said third contiguous portion 83 and the retainer strip 82 as described below.

The problem of skipping an area near a corner is not nearly so acute when the spray bar moves from the front or rear of the automobile to a side, since the sides of automobiles are generally smooth and therefore more easily cleaned. Thus, suitable extension means could be placed but are not necessary on each corner of the cam track. Suitable retainer strips, such as the retainer strip 84 and the retainer strip 85, are provided at every corner and even on those corners where an extension means is not used. FIG. 2 shows an extension means 76 and an oppositely mounted extension means 86. The carriage illustrated in FIG. 1 would travel in a counterclockwise direction in FIG. 1 and 2 for the extension means 86 and 76.

The motor dolly 46 is illustrated in FIGS. 3, 4 and 5. The motor dolly 46 is passively and slidably mounted on the motor track 44. The specific structure of the motor dolly depends upon the structure of the motor track 44. The preferred motor track 44 is an I-beam. The preferred dolly is a channel member 102 having four vertically rotatable wheels 104, 106, 108 and 110 mounted on its parallel side walls (i.e. so that they rotate on horizontal axes. These four wheels ride along the lower flange of the I-beam motor track 44. Four horizontally rotatable small wheels 112, 114, 116 and 118 are rotatably mounted to L-brackets 122, 124, 126 and 128 which are in turn mounted to the sidewalls of the channel member 102. These small wheels 112, 114, 116 and 118 rotate on vertical axes. The four small horizontally rotatable wheels 112 to 118 seat against the web 45 of the motor track 44 and maintain the motor dolly centrally located on the motor track 44. The motor 48 is suitably mounted beneath the motor dolly by means of threaded bolts 132, 133, 134 and 135 connected directly from the channel member 102 to the motor 48.

A swivel 139 is mounted to the casing of the motor 48 preferably in recess provided therein. The motor shaft 140 extends through the swivel 139 and has a pulley 142 attached at its lower end. This motor shaft extends into the carriage 50 shown in phantom in FIG. 4. The details of the swivel 139 are shown in FIG. 6.

The purpose of the swivel is to permit three things to occur simultaneously; water must be conducted to the rotating carriage 50 and its spray bar 54; mechanical energy for driving the carriage must be transmitted from the motor dolly to the carriage 50; and the carriage must be able to make an infinite number of revolutions around the carriage track 40. To accomplish this, i have made the motor shaft and the swivel coaxial to the center of rotation of the carriage. The swivel 139 has a stationary outer member 150 with a stationary first port 152 and a rotatable inner unit 153 with a rotatable port 156. The rotatable inner unit 153 comprises an inner sleeve 184 and a member 154. The two parts 154 and 184 are in effect one rotatable inner unit rotating as a single unit but are made separately for ease in machining. Seals are provided to prevent leakage as the joints between them. They may be keyed together by conventional means or by merely having a dent formed at the outer surface of their interface. Obviously the inner unit 153 could be adapted to be the stationary member and the outer member adapted to be the rotatable member. However, in the preferred embodiment a bored flange 155 is provided on the outer member for mounting the swivel to the motor 48 by bolts such as 157, 158 and 159.

The outer member 150 has a circular, cylindrical cavity 162 which opens at its lower end 164 to the exterior of this outer member 150. The outer member 150 is further provided with a first port 152 which provides fluid communication between the exterior of the outer member 150 and the circular cylindrical cavity 162. As illustrated, the port 152 is threaded to facilitate connection of suitable fluid conduits. The inner cylindrical member 154 of the unit 153 is matingly, sealingly and rotatably positioned in the cylindrical cavity 162 of the outer member 150. A longitudinal coaxial bore 166 is provided coaxially through the inner sleeve 184 of the unit 153. The motor shaft 140 extends through this coaxial bore 166. Surrounding the bore 166, but not in fluid communication with it, is a chamber 168 formed between the members 154 and 184. The cylindrical member 154 is provided with a second threaded port 156 which provides communication between the exterior of the cylindrical member 154 and the chamber 168. A plurality of circumferentially spaced openings such as 178 and 179 formed through the member 154 registrable with the first port 152, provide a passageway means for fluid communication between the first port 152 and the chamber 168. In order to minimize the resistance to fluid flow and to allow continuous fluid flow regardless of the angular position of the inner member 154, an annular duct 180 is formed mainly in the outer member 150 between the inner cylindrical member 154 and the outer member 150. This annular duct 180 communicates with the first port 152 and with the passageway means such as openings 178 and 179.

Thus, in a preferred embodiment, water and cleaning chemicals flow into the first port 152, which is stationary, through and around the annular duct 180, through the passageway means such as openings 178 and 179, which are circumferentially spaced around the cylindrical member 154, and continue through the chamber 168, and flow ultimately out the second rotatable port 156. Regardless of the angular position of the inner member 154 relative to the outer member 150, the fluid will flow from the first port 152 to and out the second port 156.

We have found it preferable, as stated above, to form the inner cylindrical member 153 of two subassemblies: an outer sleeve 154 and a coaxial inner sleeve 184 which is positioned within the outer sleeve 154. These sleeves are sealingly engaged at a pair of spaced interfaces 186 and 188. We have found it desirable to further seal these interfaces with O-rings 189 and 190. The chamber 168 is thus formed by an annular void between the sleeves 154 and 184 and between the interfaces 186 and 188. In the preferred embodiment, the chamber 168 is ground into the inner sleeve 184. An annular shoulder 192 is formed at the lower end of the cylindrical portion of the member 154 to prevent longitudinal movement of the inner member 154 relative to the outer member 150. Similarly an annular shoulder 194 is formed at the opposite end of the inner member 154 by a plate 196 attached by three screws such as screw 198 to the main body of the inner member 154. The two shoulders cooperate to prevent axial longitudinal movement of the inner member 154 relative to the outer member 150.

In the preferred embodiment the walls of the circular cylindrical cavity 162 formed in the outer member 150 include several sealing ring members. This permits rotation of the inner unit 153 relative to the outer member 150 while preventing the leakage of fluid at the interface of the circular cylindrical cavity 162 with the exterior portion of the inner unit 153. These sealing rings, of the circular and rectangular cross section-types are considered to be, in the preferred embodiment, a portion of the outer member 150. As an alternative these could be replaced by extending the solid metal portion of the outer member 150 to replace them. As a further alternative they could become a portion of the inner unit 153. It is only necessary that the inner unit 153 and the outer member 150 meet as a circular interface to permit rotation of one relative to the other.

The carriage 50 and its associated structure is illustrated in more detail in FIGS. 3, 7 and 8. The motor 48 is illustrated with its drive shaft 140 extending coaxially downwardly through the swivel 139 into the carriage 50. The carriage comprises a box beam 200 which is rotatably mounted to the motor dolly 46. The preferred method of mounting is to fix the motor shaft 140 in a pair of flange bearings 202 and 203 fastened to the beam 200. These flange bearings 202 and 203 support one end of the beam 200 vertically but permit rotation of the beam 200 around the axis of the motor shaft 140. They also permit vertical adjustment of the beam 200 during installation to make it horizontal. The beam 200 extends outwardly to and preferably beyond the carriage track 40. A pair of horizontal rollers 204 and 206 are mounted near the end of the beam 200 on opposite sides of the carriage track 40 and are axially positionable by means of set screws not shown. These rollers 204 and 206 function as a first cam follower in cam relationship with the carriage track 40 to maintain the carriage track 40 between the rollers 204 and 206 and in contact with the drive wheel 52. The drive wheel 52 rests on the carriage track 40 and thus the outer end of the beam 200 is supported on the track 40. The drive wheel 52 drivingly engages the carriage track 40 and is fixed to a drive wheel shaft 220 which is journaled in a transmission located in a housing 218. Mechanical energy is transmitted and applied to the drive wheel from the motor by a drive means drivingly connected to the shaft 140 of the motor 48 at one end and the drive wheel 52 at the other end. The preferred drive means includes a motor pulley 142 on shaft 140, a belt 212, a transmission pulley 214, a transmission input shaft 216, a transmission contained within the housing 218 and the drive wheel shaft 220 drivingly connected to the drive wheel 52. Thus the cam wheels 204 and 206 maintain the drive wheel 52 in engagement with the carriage track 40 while the rotation of the motor 48 drives the drive wheel 52.

A multiple nozzle spray bar 54 is slidably mounted to and beneath the beam 200. The spray bar 54 is mounted to permit horizontal translation of the bar 54 relative to the beam 200. This means that the spray bar 54 can move radially in and out relative to the center or rotation of the beam 200 as the carriage moves around the carriage track 40. The preferred sliding apparatus comprises a pair of slide bearings 222 and 224 which are bolted to the beam 200. A pair of horizontal sliding rods 226 and 227 slide within the bearings 222 and 224. Three mounting blocks 228, 230 and 232 are fixed to the sliding rods 226 and 227 and support six support rods 234, 235, 236, 237, 238 and 239. These support rods 234—239 are connected at their lower ends to additional clamping blocks 240, 241 and 242 in which the horizontal spray bar 244 is clamped. The six support rods 234—239 can be of any length which provides a suitable height for the spray bar. If the carriage track is low enough they can be eliminated. A protecting shield 246 is mounted to the clamping blocks 240—242 and the nozzles 245 extend from the horizontal spray bar 244 through this protective shield 246 and are, of course, in fluid connection with the horizontal bar 244. A suitable, flexible conduit 248 connects the horizontal spray bar 244 to the swivel 139.

A vertically extending spray bar 250 forming a part of the spray bar 54 is rotatably mounted to the carriage 50 and is in fluid communication as for example, at the swivel joint 252 with the horizontally extending spray bar 244. A vertical shaft 254 fixed to the top end of the vertical spray bar 250 extends vertically upward from the swivel joint 252. A second cam follower 256 if fixed to the vertical shaft 254. This second cam follower 256 is in cam relationship to the cam track 42. Movement of the second cam follower 256 as controlled by the contour of the cam track causes a rotary motion of vertical spray member 250 around its vertical axis. The cam follower 256 is preferably, although not necessarily, resiliently held in contact with the cam track 42. A pair of angle supports 258 and 260 serve as bearings supporting the vertical shaft 254 and the vertical spray bar 250.

The cam follower 256 and the cam track 42 together with its extension means such as the extension means 76 and 86 are so constructed and arranged that the spray from the spray bar 250 normally is directed at a leading direction of about 12° from a perpendicular line from the nozzles to the car surfaces. By this arrangement the water under pressure exerts a chiseling action on the deposited dirt and grime which insures better cleaning. Similar extension means can, if desired, be placed at the other two corners of the car or, for that matter, along any of the four sides although I have found that additional extension means are unnecessary where the spray is passing from the front and back to the sides of the car.

A pair of rollers 262 and 264 are mounted above the mounting block 228 and are axially adjustable by means of set screws not illustrated. These rollers 262 and 264 are in cam follower relationship to the cam track 42. They serve as a third cam follower which maintains the slidable spray bar in a fixed relationship relative to the cam track 42 and serves to slide the spray bar longitudinally relative to the beam 200 (i.e. inwardly and outwardly relative to the carriage track 40).

Thus, in summary the rollers 204 and 206 serve as a first cam follower which maintains the drive wheel 52 in driving relationship to the carriage track 40. A second cam follower 256 in cam relationship with the cam track 42 serves to orient the vertical spray bar 250 around its vertical axis. A third cam follower comprising the rollers 262 and 264 serve to orient the spray bars inward and outward radially relative to the cam track 42.

OPERATION

The operation of the apparatus may be controlled by an electronic control system using conventional equipment. Operation of the control system is initiated by the insertion of the coin in a suitable coin operated switch. A customer inserts the coin and thus brings the system to "ready" then drives his automobile into the support frame 12 beneath the carriage track 40 keeping his left wheels in the tire guide 32. He halts the car when the left front wheel drops into the stop well 34. The motor 48 is not automatically actuated by a switch in the stop well 34 and begins turning the drive wheel 52. The drive wheel moves the carriage 50 around the carriage track 40 and in so doing pulls the spray bar 54 completely around the car. Simultaneously, the proper amount of cleaning fluids and water are supplied through a suitable conduit system, through the swivel 139, and the spray bars 54, and sprayed on to the automobile positioned beneath. As the carriage 50 travels along the carriage track 40, the wheels 204 and 206 maintain the drive wheel 52 in contact with the carriage track 40. The motor dolly, along with the motor 48, is pulled passively along the motor track 44 first in one direction then oppositely. The vertically extending spray bar 250 is maintained in a position approximately beneath the cam track 42 by the wheels 262 and 264. The second cam follower 256 also follows the cam track 42 and the extension means (i.e. such as 76 and 86) in order to maintain the vertical spray bar 250 aligned to spray correctly at the nearby car surface. The strip of metal forming the symmetrical basically rectangular (with rounded corners) cam track 42 has a width larger than at least the beginning and end part of the extension means 76 and 86 and will extend lower than these portions of the extension means so that the third cam follower comprising rollers 262 and 264 will follow the symmetrical cam track 42 but the second cam follower 256 will follow the extension means 76 and 86.

Therefore, as the carriage travels along the side 61 of the carriage track (see FIG. 2) the second cam follower 256 controls the angular position of the vertical spray bar 250. It directs the spray preferably toward the direction of travel at an angle of about 78° with the car body surface. I prefer angles of 75°—80°. The second cam follower 256 is abruptly turned 90° by the retaining strip 82 and the parallel portion 79 of the extension means 76. This immediately directs the spray into the rear light of the car. The second cam follower 256 then travels between the third portion 83 of the extension means 76 and the retainer strip 82 and is further rotated so that its spray is directed several degrees opposite to its direction of travel to catch the blending surface of the auto fender. The second cam follower 256 then leaves the extension means and resumes its lead angle in the direction of travel of about 78°.

It is to be understood that while the detailed drawings and specific examples given describe the preferred embodiments of my invention, they are for the purposes of illustration only, that the apparatus of the invention is not limited to the precise details and conditions disclosed, and that various changes may be made therein without departing from the spirit of the invention which is defined by the following claims.

I claim:

1. A car wash apparatus of the type having a support frame, a pressurized water supply, at least one nozzle at times in fluid communication with the water supply for spraying water on a car, a carriage to which the nozzle is mounted for traveling around the car, and a carriage track mounted on the support frame to which the carriage is movably mounted and along which the carriage travels around the car, said apparatus comprising in combination with the above:

a. a motor track having opposite ends, spaced inwardly from said carriage track and mounted to the support frame;

b. a motor dolly mounted for longitudinal movement along the motor track;

c. a motor mounted to the motor dolly; and d. drive means for the transmission and application of mechanical energy from the motor, said means being mounted to the carriage and drivingly connected to the motor, the means extending proximate to the carriage track and connected to a drive wheel drivingly engaging the carriage track;

e. wherein, rotation of the motor rotationally drives the drive wheel along the carriage track and moves the carriage along the carriage track.

2. An apparatus according to claim 1, wherein:

a. the carriage track is an endless track surrounding the motor track; and b. the motor track is linear and is mounted centrally with respect to the carriage track.

3. An apparatus according to claim 2, wherein:

a. a fluid conducting swivel is provided which is mounted on the dolly, is provided with a fluid inlet port, has a rotatable member provided with an outlet port, and has the motor drive shaft extending coaxially through it; and b. suitable conduits are provided connecting the nozzle to the outlet port and the water supply to the inlet port.

4. An apparatus according to claim 3, wherein said swivel is a fluid conducting swivel of the type having a stationary port and a rotatable port in mutual fluid communication, the swivel comprising:

a. an outer member having a circular cylindrical cavity opening at an end to the exterior and further provided with a first port for providing fluid communication between the exterior and the cavity; and b. an inner cylindrical member matingly, sealingly, and rotatably positioned in the cavity, having a longitudinal coaxial bore therethrough, having a chamber surrounding but not communicating with the bore, having a second port for providing fluid communication between the exterior of the inner member and the chamber, and having passageway means proximate said first port for providing fluid communication between the first and the chamber;

c. wherein fluid flow may be maintained between the ports at any angular position of the inner member relative to the outer member.

5. An apparatus according to claim 4, wherein the passageway means comprises a plurality of circumferentially spaced openings and an annular duct formed between said members in fluid communication with the first port and the openings.

6. An apparatus according to claim 2, wherein:

the carriage means comprises a beam rotatably mounted to the motor dolly and extending to the carriage track, and supported by the motor dolly and the carriage track, the beam having a first cam follower means mounted thereto in cam follower cooperation with said carriage track to maintain said drive wheel in engagement with the carriage track, the drive means is mounted to the beam, and a multiple nozzle spray bar is mounted to the beam.

7. An apparatus according to claim 6, wherein:

the spray bar is slidably mounted to the beam for translation of the spray bar relative to the beam and comprises a generally horizontally extending spray member provided with a plurality of nozzles and a generally vertically extending spray member provided with a plurality of nozzles.

8. An apparatus according to claim 7, wherein:

a. an endless cam track surrounds the motor track; and b. a cooperating third cam follower is linked to the spray bar and in cam relationship with the cam track for sliding the spray bar relative to the beam during travel of the carriage around the carriage track.

9. An apparatus according to claim 8, wherein the third cam follower comprises a pair of rollers fixed to the spray bar and positioned on opposite sides of the cam track.

10. An apparatus according to claim 7, wherein the vertically extending spray member is rotatably mounted for rotation about its vertical axis.

11. An apparatus according to claim 10, wherein:

a. an endless cam track surrounds the motor track; and b. a second cam follower in cam relationship to the cam track is linked to the vertically extending spray member so that movement of said second cam follower causes rotary motion of the vertical spray member around its vertical axis.

12. An apparatus according to claim 11, wherein the cam track is approximately rectangular, surrounds the carriage track, and has a length and width approximately proportional to the length and width of a passenger automobile.

13. An apparatus according to claim 12, wherein each corner is provided with an externally spaced retaining strip guide said second cam follower into cam relationship with the cam track.

14. An apparatus according to claim 12, wherein:

the cam track has cam track extension means for causing said second cam follower to ride beyond a symmetrical corner of the cam track to be turned around the corner, and to be returned to cam relationship with the symmetrical side of the cam track.

15. An apparatus according to claim 14, wherein the cam track comprises:

a. a generally rectangular, endless cam strip having suitably rounded corners;

b. an extension strip having a first portion fixed to and parallel with one of the four sides of said rectangular strip, having a second contiguous portion parallel to and externally spaced from an adjacent side of said rectangular strip, and having a third contiguous portion extending from the second portion to said adjacent side; and c. a retainer strip externally spaced from and parallel to said second portion of the extension strip.

16. An apparatus according to claim 15, wherein:

a pair of such cam track extension means are provided at opposite corners of the cam track to extend the length of the cam track at those corners at which a carriage traveling around the carriage track initially begins its travel along the width of the cam track.

17. An apparatus according to claim 15, wherein a portion of said extension strip is narrower than a juxtaposed portion of said endless cam strip.

18. In a car wash apparatus of the type having a support frame, a pressurized water supply, a generally vertically extending spray bar having a plurality of nozzles at times in fluid communication with the water supply, a carriage to which the spray bar is mounted for traveling around a car, and an endless carriage track mounted on the support frame to which the carriage is movably mounted and along which the carriage travels, the improvement comprising in combination with the above:

a. means for rotatably mounting the vertically extending spray bar to the carriage for rotational movement around its vertical axis;

b. a cam follower linked to the vertical spray bar for causing a rotational movement of the spray bar around its vertical axis by movement of the cam follower; and c. cam track means having camming surfaces cooperating with the cam follower for at times rotating the vertical spray bar to aim said nozzles properly at a suitably positioned car.

19. An apparatus according to claim 18, wherein:

the cam means is a cam track which is approximately rectangular, surrounds the carriage track, and has a length and width approximately proportional to the length and width of a passenger automobile.

20. An apparatus according to claim 19, wherein:

the cam track has a cam track extension means for causing the cam follower to ride beyond the symmetrical corner of the cam track, to be turned around the corner, and to be returned to cam relationship with a symmetrical side of the cam track.

21. An apparatus according to claim 20, wherein the cam track comprises:
   a. a generally rectangular, endless cam strip having suitably rounded corners;
   b. an extension strip having a first portion fixed to and parallel with one of the four sides of said rectangular strip, having a second contiguous portion parallel to and externally spaced from an adjacent side of said rectangular strip, and having a third contiguous portion extending from the second portion to said adjacent side; and
   c. a retainer strip externally spaced from and parallel to said second portion of the extension strip.

22. An apparatus according to claim 21, wherein:
a pair of such cam track extension means are provided at opposite corners of the cam track to extend the length of the cam track to those corners at which a carriage traveling around the carriage track initially begins its travel along the width of the cam track; and each corner of the cam track is provided with an externally spaced retaining strip to guide said first cam follower into cam relationship with the cam track.